Jan. 8, 1957  K. C. HUDSON  2,776,565
FLUID FLOW MEASURING APPARATUS
Filed Feb. 5, 1953

*INVENTOR.*
KENNETH C. HUDSON
BY
*Arthur H. Swanson*
ATTORNEY.

United States Patent Office 2,776,565
Patented Jan. 8, 1957

2,776,565

FLUID FLOW MEASURING APPARATUS

Kenneth Clifford Hudson, Philadelphia, Pa., assignor to Minneapolis-Honeywell Regulator Company, Minneapolis, Minn., a corporation of Delaware Application February 5, 1953, Serial No. 335,361

8 Claims. (Cl. 73—204)

A general object of the present invention is to provide an improved flow measuring apparatus which is characterized by its ability to measure the rate of flow of a fluid when that flow is moving at a relatively low rate. More specifically, the invention is concerned with a thermo-electric method of fluid flow measurement wherein a fluid flowing in a conduit has a temperature signal superimposed thereon and the temperature in the conduit at displaced points will be indicative of the rate of flow of the fluid through the conduit.

In certain process control problems, the controlling or sensing the rate of the fluid flow of a fluid through a conduit is very important. Various methods have been used in the past which are very effective when the fluid flow rate is relatively high. When the fluid flow rate is low, these prior art devices are not sensitive and will not produce measurable changes in flow rate indication with minute changes of fluid flow. As it is extremely important in certain processes that this low flow be accurately measured, apparatus of the present type has a great deal of utility in the field of low flow measurement. It has been found that this low flow measurement can best be made by imposing a cyclically varying temperature signal on the fluid whose flow rate is to be measured and positioning a pair of temperature responsive devices to respond to the temperature signal.

It is accordingly a more specific object of the present invention to provide a thermo-electric flow measuring apparatus which is arranged to respond to a cyclically varying temperature signal with the phasing of the temperature signal being indicative of the flow rate.

Another object of the present invention is to provide a thermal type of flow meter wherein a pair of temperature responsive devices are axially displaced along a fluid flow path and their positions relatively adjusted to indicate a phase balance with respect to a temperature signal carried along the path in accordance with the rate of flow of a fluid.

The various features of novelty which characterize the invention are pointed out with particularity in the claims annexed to and forming a part of this specification. For a better understanding of the invention, however, its advantages, and specific objects attained with its use, reference should be had to the accompanying drawings and descriptive matter in which there is illustrated and described a preferred embodiment of the invention.

Figure 1:
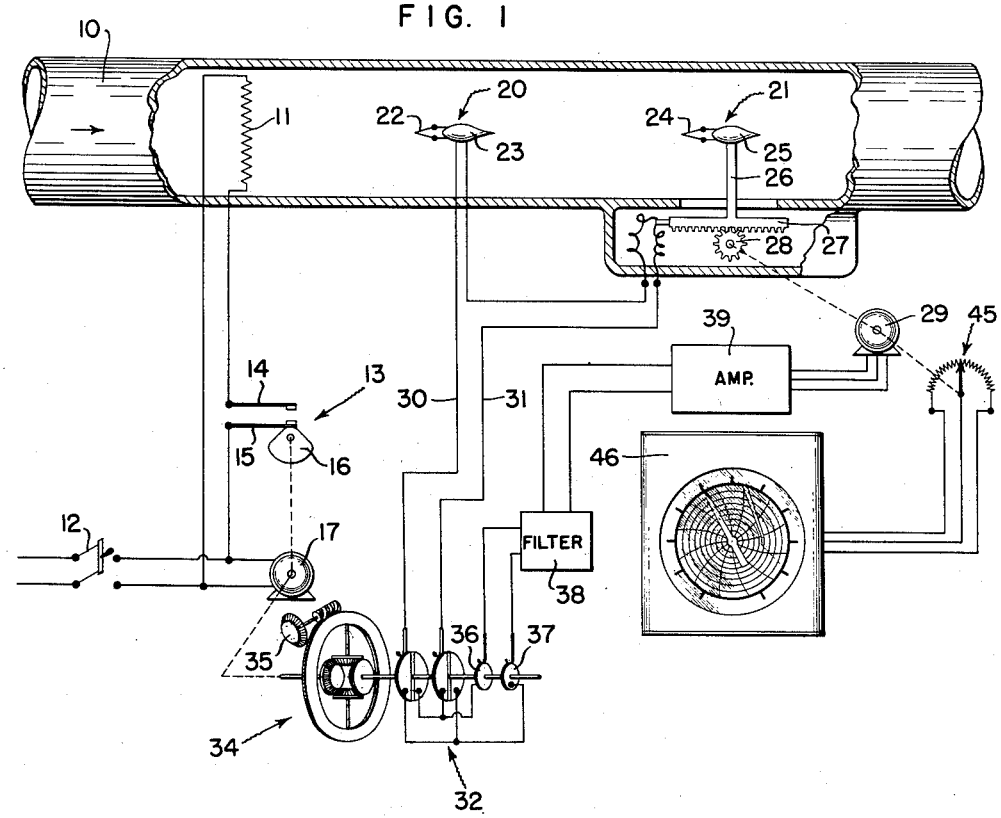
Figure 1 shows a diagrammatic view of one form that the apparatus may assume.
Figure 2:
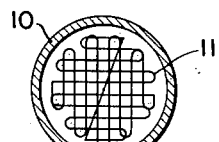
Figure 2 shows a cross sectional view of a portion of Figure 1.

Referring to Figure 1, the numeral 10 represents a conduit through which is flowing a fluid whose rate of flow is to be measured. This conduit may be of an insulating character to prevent any temperature signals other than those carried by the fluid from affecting the apparatus. Positioned in the upstream side of the conduit 10 is an appropriate heating element which, in the present arrangement, is an electrical heater 11. The manner in which the heater 11 may be formed is shown in Figure 2 which is a cross sectional view of the conduit 10 looking at the heater 11. The configuration is arranged to effect maximum heat transfer between the heater 11 and the fluid in the conduit 10 and to impose a uniform temperature signal on the fluid.

For controlling the energization of the heater 11, there is provided an electrical power circuit which is arranged to be completed by a control switch 12 and a cyclically varying switch 13. The switch 13 comprises a pair of contacts 14 and 15, the latter of which is arranged to be cyclically moved into engagement with contact 14 by a cam 16. The switching cam 16 is arranged to be driven by a suitable electrical motor 17 which will preferably be running at a speed synchronous with the source of power for the heater 11.

Positioned downstream of the heater 11 are a pair of temperature sensitive devices 20 and 21. The device 20 comprises a thermocouple 22 mounted on the upstream side of a streamlined mounting device 23. The device 20 is preferably mounted in a fixed position in the conduit 10. The temperature responsive device 21 comprises a thermocouple element 24 mounted on the forward end of a streamlined housing 25. This streamlined housing is supported by a suitable element 26 which is carried by a rack 27. The rack 27 is movable in a direction so that the device 21 will move along the longitudinal axis of the conduit 10. A pinion gear 28 engages the rack 27 and is driven by a motor 29.

The outputs of the thermocouples 22 and 24 are connected in series opposition so that appearing upon the leads 30 and 31 will be a potential which is proportional to the temperature difference between the temperatures of the couples 22 and 24. The signal which is on the leads 30 and 31 is fed through a synchronously driven commutator 32 which is arranged to reversibly connect the leads 30 and 31 to the input of a suitable amplifier 39.

The synchronously driven commutator 32 is arranged to be driven by the motor 17 through a suitable phase changing gear drive 34. The relative output motion of the motor 17 and the motion of the commutator 32 may be adjusted by turning the adjustment knob 35. The output of the commutator section is taken from a pair of slip rings 36 and 37 and is fed through a suitable direct current filter network 38 to the input of the amplifier 39. The amplifier 39 may take the form of the apparatus shown in the Walter P. Wills patent, 2,423,540, issued July 7, 1947. Suitable connection may be made to reversibly drive the motor 29 in accordance with the unbalance signal on the input of the apparatus.

In order to provide an indication of the fluid flow, the motor 29 may be used to adjust a potentiometer 45 which is connected to the input of an indicating and controlling instrument 46. This instrument may also assume the form of the instrument shown in the above mentioned Wills patent.

In considering the operation of the present apparatus, consider first the operation of the heater 11 and the manner in which it introduces a temperature signal into the fluid flowing through the conduit 10. When the switch 12 is closed, an energizing circuit is completed to the motor 17 and this motor will cyclically drive the switching cam 16 so that the contact 15 will engage the contact 14 to close an energizing circuit to the heater 11. After the energizing circuit has been closed for a predetermined time, the contacts 14 and 15 will separate to open the circuit. With fluid flowing through the conduit 10, the cyclic operation of the switch 13 will cause a cyclically varying temperature signal to be applied to the fluid in the conduit.

Figure 3:
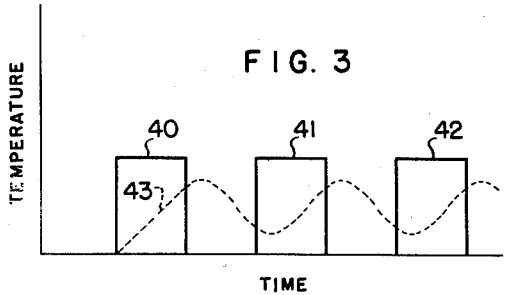
Figure 3 shows in graphical form the manner in which the cyclically varying signal is provided.

In Figure 3 is shown graphically the manner in which the temperature signal is produced on the fluid flowing in the conduit. The pulses 40, 41, and 42 represent the heating pulses produced by the energization of the heater 11 while the dotted curve 43 represents the temperature of the fluid as it responds to the heating action of the pulses 40, 41, and 42. It will be noted that this curve 43 is a cyclically varying signal having a peak to peak amplitude which remains substantially constant and proportional to the magnitude of the energizing pulses 40, 41, and 42. The operation of the apparatus may be somewhat enhanced by providing relatively sharp pulses or a sharp signal which need not assume a sine wave shape.

The sharpening of the pulses may be effected by increasing the rate of heat transferred to the fluid as it passes the heater grid 11. This is most conveniently done by increasing the heat radiating surface of the heater and by decreasing or eliminating the insulation thickness on the heater, the latter insulation thickness factor being dependent upon the type of fluid that is flowing in the conduit. Obviously, if the fluid is one which has an extremely high electrical resistance, there need be no insulation upon the heater. The resultant effect of the sharpening of the heat pulses permits a higher amplitude pulse and a pulse repetition rate which is higher. This in turn has the effect of producing a larger working signal so that the output signal may be made to make larger changes for a predetermined change in fluid flow. In referring to Fig. 3, it will be readily apparent that if the working signal 43 is relatively small in amplitude, it will be difficult to obtain a useable output signal from which a temperature different signal of useful magnitude may be obtained.

The cyclically varying signal will have a frequency which is dependent upon the speed of operation of the motor 17 and its associated switching cam 16. The speed with which this is driven will be dependent upon the flow rate range over which the apparatus is expected to operate. This of course depends upon the cross sectional area of the conduit 10 as well as other cross sectional dimensions.

The temperature signal introduced by the heater 11 will be passed along the downstream path of the fluid flowing in the conduit 10. The temperature signal will first strike the thermocouple 22 which will produce an output signal proportional to the temperature of the couple. The fluid with the temperature signal thereon moves along the conduit until it strikes the thermocouple 24 which couple will likewise have an output which will be proportional to the temperature thereof. If the apparatus is properly adjusted, and the couples 22 and 24 are exactly one wave length separated from each other, their temperatures will be the same throughout the cyclic variations of the signals. As long as the temperatures of the two couples remain the same, the outputs thereof, which are connected in series opposition, will produce a net output signal of zero. There will thus be no signal applied to the input of the amplifier 33 and therefore its output motor 29 will remain in a fixed position.

Figure 4:
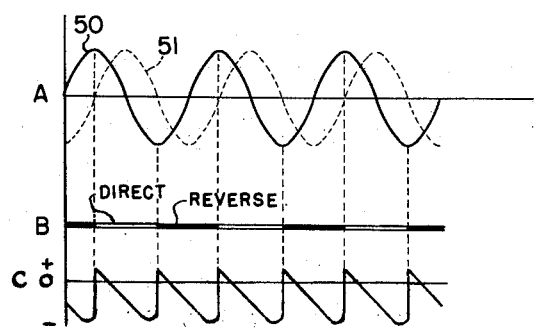
Figure 4 shows a set of curves indicating a mode of operation of the apparatus.

If there is a displacement between the positions of the thermocouples 22 and 24 so that they are not always at the same temperature, which will occur when the flow rate changes from that explained above, it is desired that the apparatus operate until a balance or zero input position is reached. Referring to Figure 4, there is shown graphically the manner in which an unbalance signal will appear on the input of the instrument 39. In section A of Figure 4, there is plotted graphically the cyclic variations of temperature of the thermocouples in terms of their output voltage. The curve 50 represents the output of the thermocouple 22 while the curve 51 represents the output of the thermocouple 24. As shown, the outputs of the two thermocouples 22 and 24 are displaced, for example, by approximately 90 degrees in terms of the cyclically varied temperature signal. By adjusting the commutator 32 to operate in accordance with the signal applied to the thermocouple 22, with the switching action taking place at the 90° and 270° points it is possible to make the output voltage from the thermocouple 22 serve as a reference signal which has an average D. C. signal magnitude of zero. The commutator switching action is shown in section B of Figure 4. The commutator switch thus operates to reverse the connections of the leads 30 and 31 to the input of the instrument 39 every 180 degrees of the input temperature signal and, as shown, in fixed phase with respect to the temperature signal on the thermocouple 22.

With the commutator phased as set forth above, and with the temperature signal on the thermocouple 24 being displaced 90 electrical degrees from that of the thermocouple 22, there will be produced an output voltage on the commutator rings 36 and 37 and this voltage will take the form shown in section C of Figure 4. It will be noted that the signal is a series of direct current pulses whose average is negative which pulses will be fed through the filter section 38 to the input of the instrument 39. This may be obtained by a point by point plot of the curves 50 and 51 recognizing the curve 51 is in opposition to that of curve 50 and the outputs are reversed every half cycle. The instrument 39 will in turn produce an output signal which will be effective to drive the motor 29 and this motor will drive the pinion gear 28 to reposition the rack 27 and the temperature responsive device 21 to a position where the temperature of the couple 24 will be the same as that of the couple 22. The mechanical spacing between the couples 22 and 24, when they are at the same temperature, will indicate the rate of flow of the fluid through the conduit 10. Should the phasing of the temperature signals be reversed, it will be obvious that the output will be a series of positive pulses and the instrument 39 will cause the motor 29 to be driven in the reverse direction until a balance point is once again reached.

While, in accordance with the provisions of the statutes, there has been illustrated and described the best form of the embodiment of the invention known, it will be apparent to those skilled in the art that changes may be in the form of the apparatus disclosed without departing from the spirit of the invention as set forth in the appended claims.

Having now described my invention what I claim as new and desire to secure by Letters Patent, is:

1. A thermo-electric apparatus for measuring the rate of flow of a fluid through a conduit comprising, a heater positioned relative to said conduit to vary the temperature of the fluid flowing through the conduit, cyclically operative means for cyclically energizing said heater so that the temperature of the fluid flowing through the conduit will vary in a cyclic manner, a first temperature responsive device positioned within the conduit and responsive to the cyclic variations in temperature caused by said heater, a second temperature responsive device positioned in displaced relationship along the fluid flow path of said conduit with respect to said first temperature responsive device and responsive to the cyclic temperature variations of said heater, means mounting one of said temperature responsive devices for adjustment of said responsive devices with respect to each other along the flow path of said conduit, and control means connected to respond to the temperature response of said first and second responsive devices and connected to adjust one of said temperature responsive devices so as to vary the relative displacement between said temperature responsive devices such that the temperature indications thereof are in-phase, said last named means producing an indication of the rate of fluid flow.

2. Apparatus as set forth in claim 1 wherein said control means comprises apparatus producing an electrical output proportional to the phase difference of the temperature responses of said temperature responsive devices.

3. Apparatus for measuring the rate of flow of a fluid through a conduit comprising, heating means positioned in said conduit, cyclically operated means for cyclically varying the heat output of said heating means, a pair of temperature responsive elements displaced axially of said conduit relative to each other and to said heating means and positioned in said conduit downstream of said heating means, means mounting said responsive elements for movement relative to each other along the axis of fluid flow, said responsive elements producing an output signal indicative of a temperature difference between said responsive elements, an output signal responsive means arranged to adjust one of said responsive elements along the axis of fluid flow in said conduit to a position wherein the temperature of both of said responsive elements will remain the same, and flow indicating means connected to said temperature responsive elements.

4. In a thermal flow measuring apparatus, the combination comprising, means cyclically varying the temperature of a fluid flowing through a conduit, a pair of temperature responsive elements displaced from each other and from said means cyclically varying the temperature along the flow axis in said conduit downstream of said means and producing an output signal indicative of a difference between the temperatures of said elements, means mounting said responsive elements for movement relative to each other along said flow axis, control means responsive to the output signal difference of said responsive elements, and means including said control means for adjusting one of said elements relative to the other along said flow axis so that there is no temperature difference between said elements, said last named means further including means indicative of the flow rate in said conduit.

5. A thermal flow measuring apparatus comprising, a conduit through which is flowing a fluid whose rate of flow is to be measured, a cyclically energized heater element positioned in the upstream side of said conduit and positioned with respect to the fluid in said conduit to cyclically vary the temperature of the fluid flowing through said conduit, said heater being cyclically energized by cyclically operative energizing means, a pair of temperature responsive devices positioned downstream of said heater and spaced from each other in the direction of the flow of fluid through said conduit to produce signals proportional to the cyclic temperature variations of the fluid flowing in said conduit, means mounting said responsive devices for movement relative to each other in the direction of the flow of fluid through said conduit, and means responsive to the temperature signal difference of said responsive devices for adjusting one of said devices to a position of temperature equality with the other of said devices and thereby indicating the rate of flow of the fluid through said conduit.

6. A fluid flow measuring apparatus comprising, means for cyclically varying the temperature of a fluid flowing through a conduit along the axial flow path of the conduit, a pair of temperature responsive devices positioned along the flow axis of the conduit in displaced relationship to each other and to the first named means and downstream of the first named means along the flow axis of the conduit, means mounting said responsive devices for movement relative to each other along the flow axis of the conduit, and means adjusting the position of said responsive devices relative to each other along the flow path in said conduit so that the temperatures thereof are the same, said adjustment indicating the rate of flow of fluid through said conduit.

7. Fluid flow measuring apparatus for measuring the rate of flow of a fluid through a conduit, including in combination, an electrical heater positioned upstream in the conduit, means cyclically applying power to said heater so that said heater will cause cyclic variations in the temperature of the fluid flowing through the conduit, a pair of temperature responsive devices disposed downstream of said heater and displaced and movable with respect to each other and to said electrical heater and to the conduit along the flow axis in said conduit, each of said devices having an output signal indicative of the temperature thereof, and control means responsive to the difference between the output signals of said devices and connected to adjust one of said devices relative to the other until the temperature signals of each of said devices are the same even while they are cyclically varying, said adjustment indicating the rate of fluid flow.

8. In apparatus for measuring the flow of a fluid in a conduit wherein the temperature of the fluid is cyclically varying at a constant rate, the combination comprising, a pair of temperature responsive devices displaced from each other along the flow axis of said conduit, means mounting one of said devices for movement relative to the other along the flow path of said conduit, and means controlled by the output temperature signals of said devices so as to adjust said one of said devices along the flow axis of said conduit until the instantaneous temperatures of said devices are of a predetermined relationship.

References Cited in the file of this patent

UNITED STATES PATENTS

| | | |
|---|---|---|
| 2,274,262 | Wolff | Feb. 24, 1942 |
| 2,536,082 | Perkins | Jan. 2, 1951 |
| 2,603,089 | Morley et al. | July 15, 1952 |
| 2,632,326 | Stuart | Mar. 24, 1953 |